F. L. HUNT.
CLOSURE FOR LEVER SLOTS.
APPLICATION FILED OCT. 27, 1920.
1,405,135.
Patented Jan. 31, 1922.
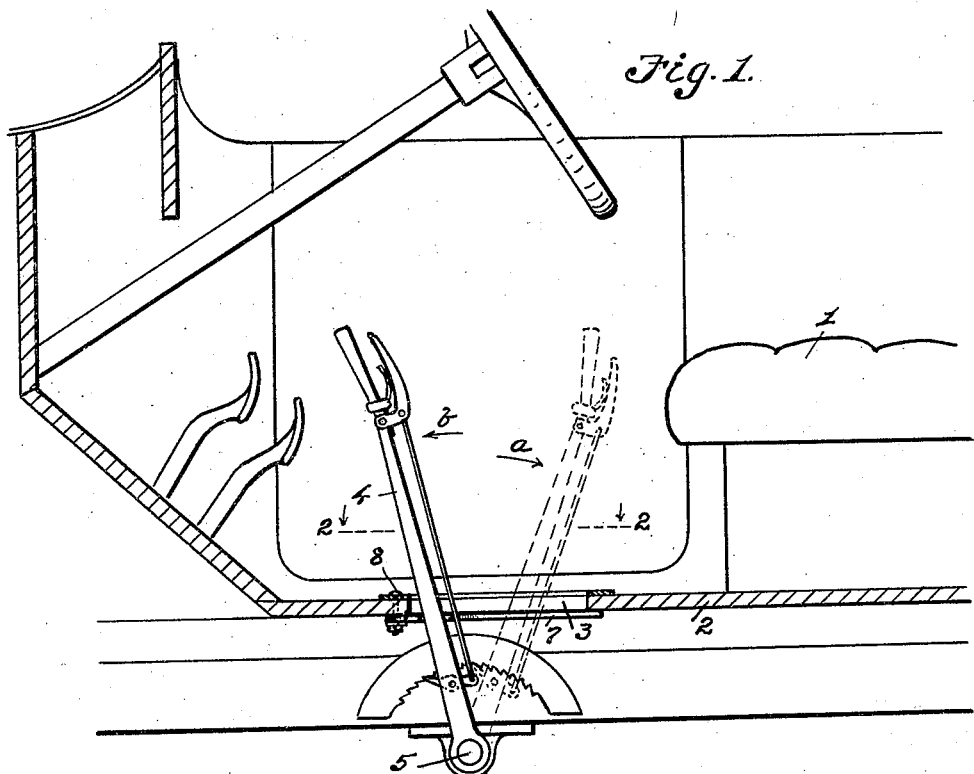
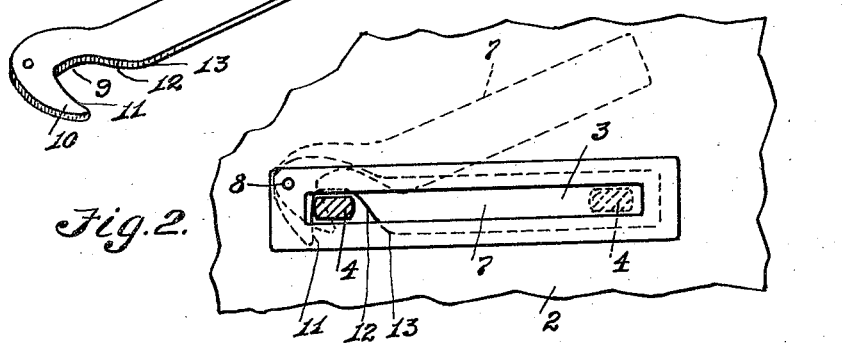
Fred L. Hunt
INVENTOR.
BY George J. Oltsch
ATTORNEY.

UNITED STATES PATENT OFFICE.

FRED L. HUNT, OF MISHAWAKA, INDIANA, ASSIGNOR TO PERKINS CORPORATION, OF MISHAWAKA, INDIANA, A CORPORATION OF INDIANA.

CLOSURE FOR LEVER SLOTS.

1,405,135.  Specification of Letters Patent.  Patented Jan. 31, 1922.

Application filed October 27, 1920. Serial No. 419,983.

*To all whom it may concern:*

Be it known that I, FRED L. HUNT, a citizen of the United States, residing at Mishawaka, in the county of St. Joseph and State of Indiana, have invented certain new and useful Improvements in Closures for Lever Slots, of which the following is a specification.

The invention relates to closures for lever slots, and has for its object to provide a closure member for closing the emergency brake lever slot in the flooring of an automobile, when said lever is not in use, thereby preventing mud or other foreign matter from entering the body of the automobile, also for preventing the entrance of cold air around the feet of the operator during cold weather and consequently causing discomforture to the operator.

A further object is to so construct the closure member that when the lever is in its forward or inoperative position the lever will engage a lug on the closure and hold the same in closed position. Also to provide the closure with an inclined shoulder, with which shoulder the lever engages on a rearward movement thereof, and as the lever is moved rearwardly to operative position the closure is pivoted outwardly on its pivotal point and the lug which engages the forward side of the lever positioned so that on a forward movement of the lever, said lever will engage said lug and move the pivoted closure member into registration with the lever slot in the flooring of the body of the automobile.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a sectional view through a portion of an automobile body, showing the slot in the flooring thereof and the brake lever, extending through said slot.

Figure 2 is a detail sectional view taken on line 2—2 of Figure 1, showing a portion of the flooring and the emergency brake slot in elevation.

Figure 3 is a perspective view of the slot closure.

Referring to the drawings, the numeral 1 designates the front seat of a conventional form of automobile and 2 the flooring of the body of the automobile. The flooring 2 is provided with a longitudinally disposed lever slot 3, in which slot the emergency brake lever 4 swings on its pivotal point 5 in the direction of the arrow *a* when the emergency brake is set by a pull upon the connecting rod 6 and in the direction of the arrow *b* when the lever is positioned for throwing the emergency brakes out of operation. While the vehicle is moving forwardly the emergency brake lever 4 is in forward position as shown in Figure 1, however when the lever 4 is in rear position the emergency brakes are in operation and consequently the automobile is at a standstill, or is being brought to a standstill. It has been found that mud and dust enters the front compartment of the body, through the lever slot 3, thereby soiling the clothing of the operator, that is when the car is underway and the emergency brake lever 4 is in its forward position as shown in Figure 1, which position is the inoperative position of the emergency brake lever. Also during cold weather cold air enters through the lever slot 3 adjacent the operator's seat, thereby making it uncomfortable for the operator during cold weather.

To overcome the above difficulties a closure member 7 is provided, which closure member is adapted to be moved into and out of registration with the lever slot 3 when the lever 4 is forced forwardly and rearwardly. Closure member 7 is pivoted as at 8 preferably to the under side of the flooring 2 and to one side of the slot 3. The forward end of the closure member 7 is provided with a cutaway portion 9 which preferably extending inwardly beyond the longitudinal center line of the member 7, thereby forming a lug 10 having a lever engaging surface 11 preferably at a right angle to the body of the closure member and a rearwardly and outwardly inclined lever engaging edge 12 adapted to be engaged by the rear edge of the lever 4 when said lever is moved in the direction of the arrow *a* to the dotted line positions shown in Figures 1 and 2. As the lever 4 is forced rearwardly, its rear edge engages the inclined edge 12 of the closure member thereby forcing the closure member 7 laterally on its pivotal point 8 until the lever clears the shoulder 13, thereby uncovering the lever slot 3 and allowing the lever to assume the dotted line position shown in Figure 1 and the setting of the brake through the medium of the connecting rod 6. On a forward movement to the brake releasing position shown in Figure 1 in full lines, the forward edge of the lever comes into engagement with the surface 11 of the lug 10, thereby forcing said lug forwardly and consequently causing a pivotal action of the closure member 7 until it reaches a position where is will register with and close the slot 3, the inclined lever engaging edge 12 being again positioned rearwardly of the rear edge or side of the lever.

From the above it will be seen that a lever slot closure is provided which is positively operated by the lever within said slot and that where used in connection with an emergency brake lever of an automobile, that when said lever is in its normal forward inoperative position, that the lever slot is closed for preventing entrance of mud and cold air to the body of the car.

The closure member 7 is preferably pivoted in such a manner that it will not rattle incident to the movement of the automobile over uneven roads.

The invention having been set forth what is claimed as new and useful is:—

1. The combination with a lever pivoted at a point below a lever slot and extending upwardly therethrough, of a closure for said slot pivoted adjacent thereto and provided with portions adapted for contact by the lever for moving the closure to open or closed position.

2. The combination with a lever pivoted at a point below a lever slot and extending upwardly therethrough, of a closure for said slot pivoted adjacent thereto and having a recess forming opposite edge portions adapted for engagement by the lever in the movement thereof for moving the closure to open or closed position.

3. The combination with an emergency brake lever of an automobile, said lever extending through a lever slot and being pivoted at a point below said slot, of a closure member for said slot, said closure member having its forward end pivotally connected adjacent the forward end of the slot, said lever when in forward position being disposed in a cutaway portion of the closure when the closure is in registration with the slot, the rear side of said cutaway portion extending outwardly and rearwardly, the forward side of said cutaway portion being at a substantially right angle to the longitudinal center of the closure member, said outwardly and rearwardly extending side of the cutaway portion being adapted to be engaged by the rear side of the operating lever when it is moved rearwardly for forcing the closure member out of registration with the slot, said substantially right angle side of the cutaway portion being adapted to be engaged by the forward side of the lever for moving the closure into registration with the lever slot.

In testimony whereof I affix my signature.

FRED L. HUNT.